United States Patent Office 3,121,454
Patented Feb. 18, 1964

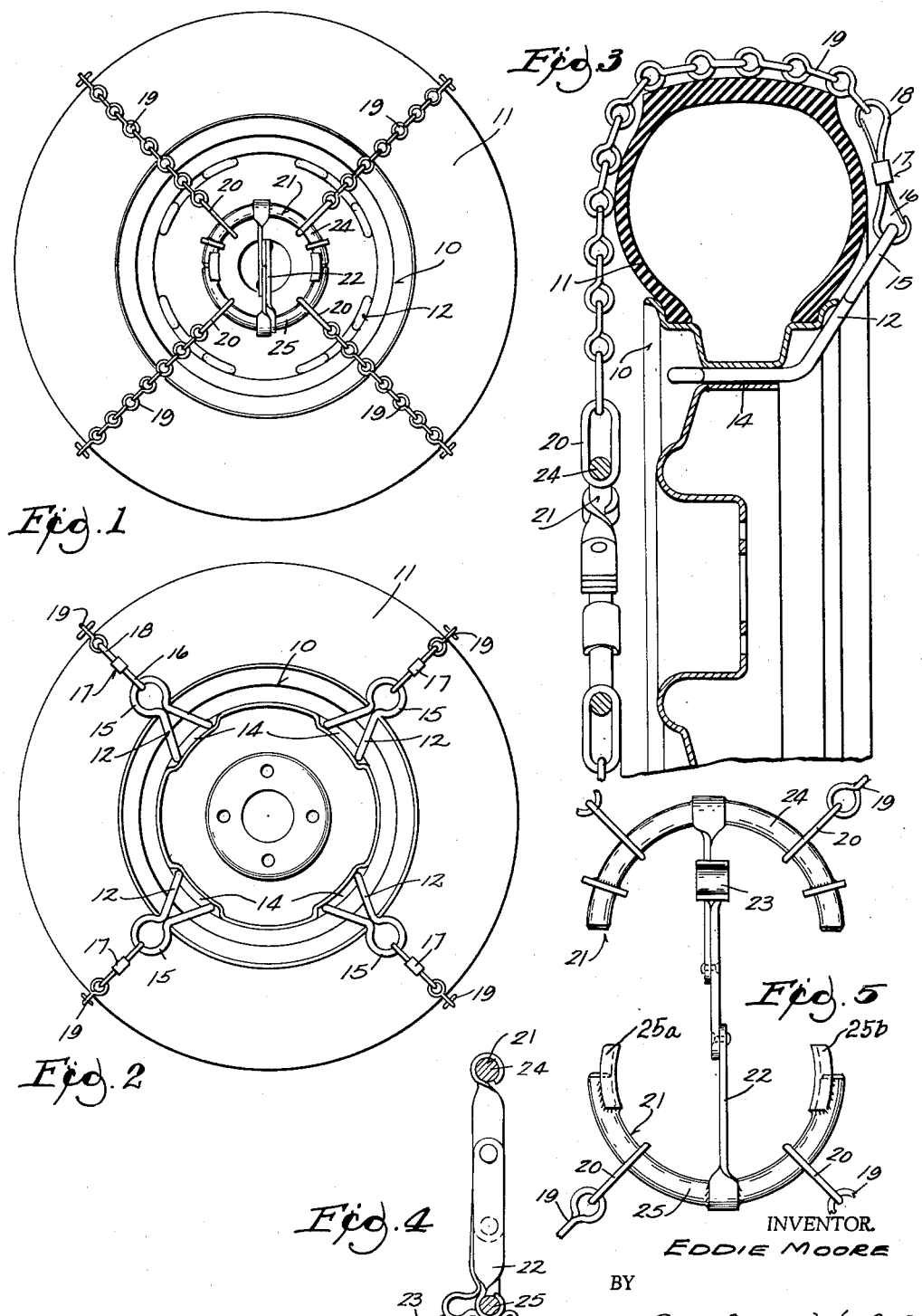

3,121,454
TIRE CHAINS
Eddie Moore, 1316 N. 11th St., Milwaukee, Wis.
Filed Apr. 23, 1962, Ser. No. 189,438
1 Claim. (Cl. 152—233)

This invention relates to improvements in tire chains, and more particularly to a novel tire chain of the quick demountable type, the same being a modification of my previous Patent No. 3,037,543, issued June 5, 1962.

An object of the invention is to provide a tire chain assembly which may be quickly applied to an automobile tire with clamping means and as quickly removed when desired.

Other and further objects of the invention will appear as the description proceeds, reference being had to the accompanying drawing, in which:

FIG. 1 is a view in elevation of the outside of an automobile tire showing a tire chain assembly embodying the invention in place.

FIG. 2 is a view in elevation of the car side of the tire and chain assembly.

FIG. 3 is a fragmentary vertical sectional view.

FIG. 4 is an edge view of the clamping means in closed position.

FIG. 5 is a plan view of the split ring and clamp in open position.

Referring more particularly to the drawing, numeral 10 refers to an automobile wheel carrying a tire 11. A plurality of bifurcated anchor elements 12 may be engaged with the disc 10 at various apertures 14. Each member 12 has an eye 15 which is engaged by one segment 16 of a snap hook 17. The remaining snap hook 18 engages a chain segment 19 which terminates in an eye 20 to be engaged on the split ring 21.

The split ring 21 is joined by a toggle clamp 22. When the handle 23 is manipulated the two halves 24 and 25 of the split ring are releasably united. The portion 25 has channel members 25a and 25b at the ends thereof to receive and seat the ends of the portion 24.

It will be understood that the device is capable of many modifications in structure and design, without departing from the spirit of the invention, within the scope of the appended claim.

Having thus described the invention what is claimed and desired to be secured by Letters Patent of the United States, is:

A tire chain assembly comprising a plurality of curved bifurcated anchor elements adapted for engagement in spaced apertures of an automotive disc wheel, a plurality of chain segments releasably engaged with said anchor elements at one end thereof, said chain segments normally extending over the tread surface of a tire on said disc wheel, a split ring attached to the opposite ends of said chain segments, a toggle clamp for uniting the segments of said split ring and retaining the chain segments in taut position over the tire tread, and a pair of channel members affixed to and projecting from the insides of the ends of one ring segment to seat the ends of the opposed segment when the toggle clamp is closed.

References Cited in the file of this patent

UNITED STATES PATENTS

| | | |
|---|---|---|
| 1,131,116 | Chubbuck | Mar. 9, 1915 |
| 2,065,810 | Karon | Dec. 29, 1936 |
| 2,524,973 | Hammond et al. | Oct. 10, 1950 |
| 2,653,642 | Cella | Sept. 29, 1953 |
| 2,880,776 | Rucker | Apr. 7, 1959 |
| 3,037,543 | Moore | June 5, 1962 |
| 3,064,703 | Schieber et al. | Nov. 20, 1962 |